United States Patent [19]
Ward

[11] 3,921,989
[45] Nov. 25, 1975

[54] NON-BINDING SHAFT SEAL ASSEMBLY FOR LIQUID FLOW DETECTORS
[75] Inventor: David M. Ward, La Jolla, Calif.
[73] Assignee: Potter Electric Signal Co., St. Louis, Mo.
[22] Filed: Feb. 1, 1974
[21] Appl. No.: 438,734

[52] U.S. Cl. ............... 277/173; 277/177; 277/188; 277/212 F; 277/5; 137/525
[51] Int. Cl.² ........................................ F16J 9/00
[58] Field of Search ........ 277/177, 173, 176, 212 F, 277/188, 30, 5; 137/525, 525.1

[56] References Cited
UNITED STATES PATENTS
2,990,849  7/1961  Peras ........................ 137/525.1 X
3,324,877  6/1967  Bochan ........................ 137/525 X Primary Examiner—Samuel B. Rothberg

[57] ABSTRACT

A non-binding shaft seal assembly is provided for liquid flow detectors, as in alarms for sprinkler systems. Such detectors have a pivoted shaft projecting outward from a casing bore opening to be sealed. Pivoting of the shaft is facilitated by the sliding of a washer against a Teflon facing. Provision is made for passing air through the seal when the system is drained, to avoid blow-out or rupture.

5 Claims, 4 Drawing Figures

NON-BINDING SHAFT SEAL ASSEMBLY FOR LIQUID FLOW DETECTORS

Background of the Invention

To signal the discharge of a sprinkler head, water-flow detectors are used. Usually these have a casing secured to the pipe in which the water will flow. A shaft projecting inward from the detector casing extends through a hole drilled in the water pipe to support a flow-responsive vane. The casing of such a detector typically has a forward bore opening through which the shaft passes and at which it is pivoted, so that the end outstanding from the pivot may actuate an electric signal switch.

Since the casing is open to the water pipe, its forward bore opening must be sealed around the pivoted shaft. Under the high liquid pressures normally encountered in sprinkler systems, a soft rubber seal will tend to extrude forwardly into the bore opening around the shaft, preventing it from pivoting freely.

A different type of difficulty may be encountered when the water is drained from the sprinkler system. This may create an almost total vacuum; the external atmospheric pressure against the seal may cause it to blow inward or to rupture, putting the system out of operation until the seal is replaced.

Summary of the Invention

In the present invention these difficulties are overcome by providing a shaft seal assembly which prevents extrusion of the molded rubber seal and provides an easy sliding action when the shaft pivots. The elastic rubber-like seal is described more fully hereafter. A washer, which may be stainless steel, is positioned forwardly of the seal, to bear against a slick facing member on the inner forward surface of the casing. The washer has an inner diameter sufficiently greater than that of the shaft to fit loosely on it, and an outer diameter substantially less than the diameter of the seal. The facing member, mounted to the inner forward face of the casing concentric with its bore opening, is formed of a material such as Teflon which is characterized by a low coefficient of friction.

Even though the water pressure within the casing may be high, the washer prevents extrusion of the seal material into the bore opening. When the shaft is deflected angularly, the washer will slide easily on the slick-surfaced facing member. Hence high water pressure will not cause binding of the shaft or substantially interfere with its angular deflection.

To secure the seal in place, it is formed with an outer ring-like compressible flange, retained in a preferably square-cut seal-retaining groove in the casing. The uncompressed thickness of the seal flange so exceeds the width of the seal-retaining groove that to insert it within the groove requires compression greater than atmospheric pressure. Since the seal material is elastic, it exerts a continuing resistance pressure against the forward and aft groove walls equal to the pressure required to insert it. In contrast, the hub portion of the seal grasps the shaft with a pressure substantially less than atmospheric pressure. Should the system be drained and a vacuum be created within the casing, the resulting excess of external atmospheric pressure will be insufficient to overcome the resistance pressure with which the seal flange holds to the groove. However, such excess of external pressure may be great enough to overcome the grasp of the hub portion on the shaft. In this case, air will flow through the hub portion, to relieve the pressure differential without rupturing the seal.

Description of the Preferred Embodiment

Figure 1:
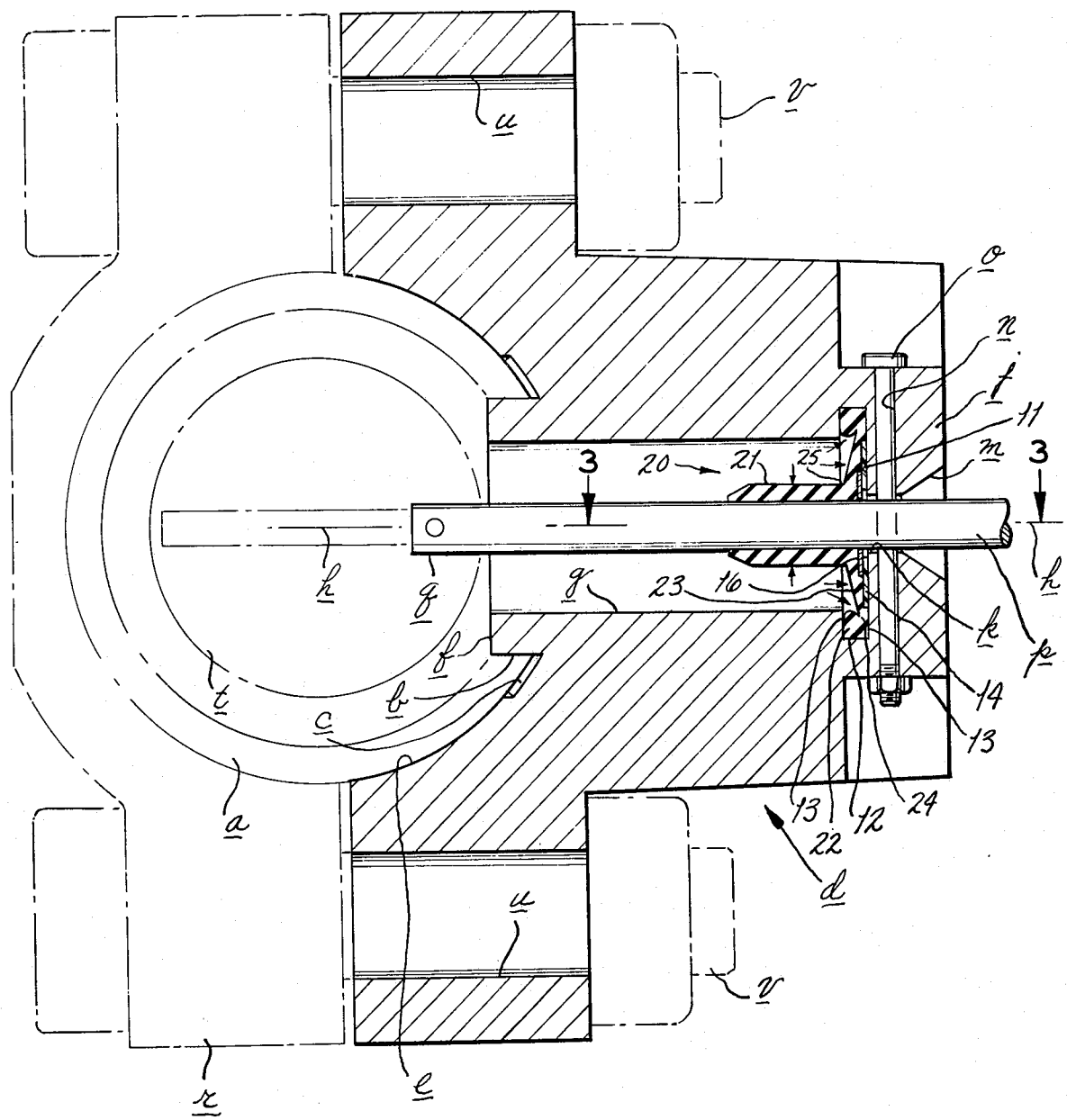
FIG. 1 is a sectional view of the non-binding shaft seal assembly of the present invention as seen in section, assembled as part of a water-flow sensor for a sprinkler system.

For detecting the flow of water in pipes which supply sprinkler systems and the like, installation of a sensor assembly may be made as shown in FIG. 1. In the side wall of the water supply pipe $a$ a large perpendicular hole $b$ is bored and its edge provided with a sealing washer $c$. A sensor housing generally designated $d$ has a concave aft face $e$ from which a cylindrical boss $f$ projects, the face $e$ being recessed around the boss $f$ to accommodate the sealing washer $c$. The showing is somewhat schematic.

The housing $d$ has a cylindrical chamber $g$ formed about an axis $h—h$ which extends from the boss $f$ to a forward end wall $j$, along which axis the wall $j$ has a central bore $k$ whose outer entrant portion $m$ may be tapered as shown. Inward of the tapering portion $m$ the wall $j$ has a lateral bore $n$ in which is provided a pivot pin $o$. On the pin $o$ is mounted a pivoted shaft $p$ which normally extends centrally through the bore $k$, along the axis $h—h$ through and beyond the cylindrical chamber $g$, to an end $q$ which projects within the water supply pipe $a$. Secured to its end $q$ by rivets or other suitable means is a vane $t$, preferably formed of flexible plastic so as to be insertable through the hole $b$.

A housing back bracket $r$, which may be cast to the general configuration shown, fits around the aft side of the pipe $a$ and has bores aligned with fore-and-aft housing bores $u$ to mount the housing $d$ by bolts $v$. The structure so far described is conventional.

Since the cylindrical chamber $g$ is open to the interior of the water supply pipe $a$, it is of course necessary to supply a seal to prevent the escape of water through the bore $k$ around the shaft $p$. The pressure in the water supply pipe $a$ may normally be at least 100 p.s.i., but in some instances may rise to over 400 p.s.i. When rubber-like material is used which has sufficient flexibility to provide a seal around the shaft $p$ without strong spring-like resistance to its angular movement, the water pressure would be likely to extrude such material into the bore $k$, thus tending to bind and interfere with free pivoting of the shaft $p$.

Figure 3:
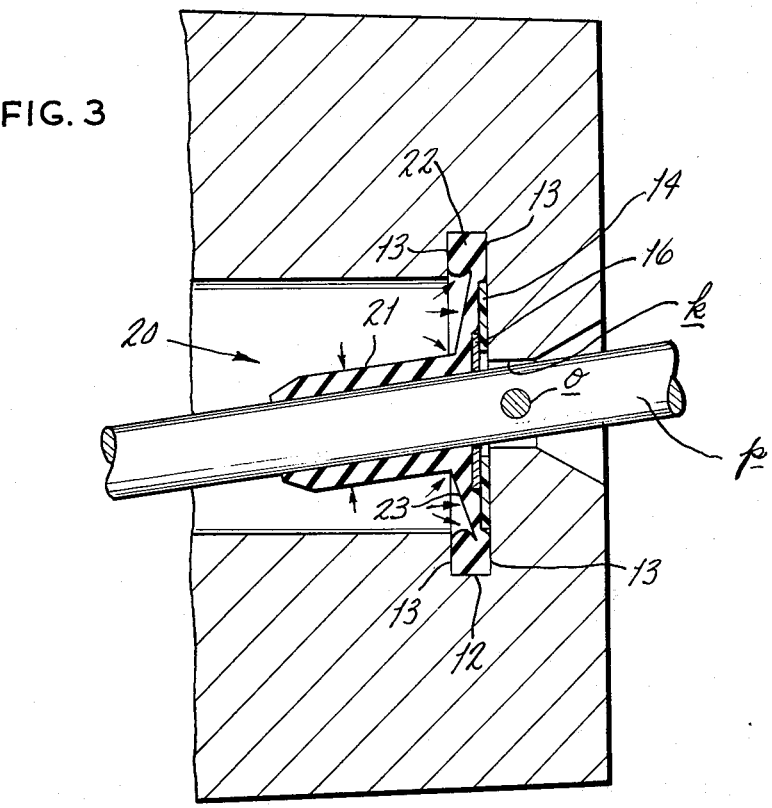
FIG. 3 is a somewhat enlarged fragmentary sectional view as seen along line 3—3 of FIG. 1, with the sensor shaft deflected angularly, as when water flow is sensed.
Figure 4:
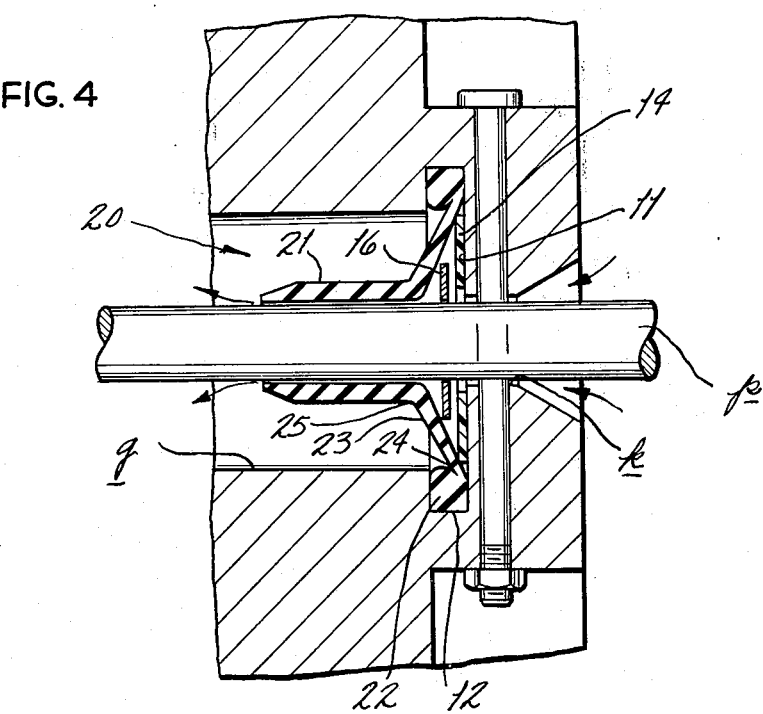
FIG. 4 is a fragmentary view similar to FIG. 1, somewhat enlarged, showing how air may flow in safely when the system is drained.

To overcome this problem, I have devised the following sealing provisions:

The forward end of the cylindrical chamber $g$ has an inner forward planar surface 11 formed perpendicular to the axis $h—h$. Its radial extend is greater than that of the chamber $g$, terminating in an annular, preferably square cut seal retaining groove 12 whose width is defined by opposed parallel side wall portions 13 as seen in FIGS. 1, 3 and 4.

To co-operate therewith I provide a sliding seal assembly. A first principal member thereof is an annular facing member 14, formed of a material, such as Teflon, whose surface is characterized by a low coefficient of friction, especially when metal is slid over its slick surface. The shape of the facing member 14 is generally washer-like, having an inner diameter at least as great as and preferably greater than that of the bore $k$ and an outer diameter not great enough to extend into the annular groove 12. While the facing member 14 is in a functional sense part of the shaft seal assembly, it may advantageously be secured, as by cementing, concentrically about the bore $k$ to the forward inner planar surface 11.

A second member of the shaft seal assembly is a slide washer 16 formed of a material, such as stainless steel, which is nonextrudable under the pressures encountered in the system and which will slide readily against the slick aft-presented surface of the facing member 14. The inner diameter of the washer 16 is slightly greater than that of the shaft $p$, so as to fit loosely on it, permitting the passage of air and also free angular displacement, as shown in FIG. 3. In the preferred embodiment shown, the outer diameter of the washer 16 is substantially less than that of the annular facing member 14. When the shaft $p$ pivots as in FIG. 3, the washer 16 will be displaced from central position, but will maintain flatwise abutting contact against the slick surface of the facing member 14.

The third and principal member of the shaft seal assembly is the molded rubber-like seal member generally designated 20. The material from which it is formed is preferably soft and rubber-like; when subjected to the water pressure within the system (as shown by small arrows in FIGS. 1 and 3) it flows into the available spaces much as would a liquid. A preferred material is a neoprene rubber having a Shore rating of approximately A-35, or within the range of A-20 to A-50.

Figure 2:
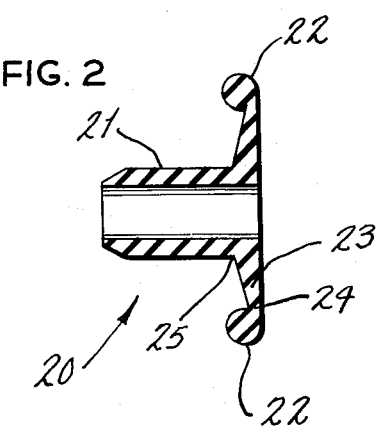
FIG. 2 is a sectional view of the rubber seal member utilized in the assembly of FIG. 1, shown as molded and prior to assembly.

In the condition as molded (that is, free from externally applied forces) the shape of the seal member 20 is as shown in section in FIG. 2. It includes a central, longitudinally inward-extending hollow hub portion 21; an outer ring-like compressible flange 22 which when uncompressed is substantially circular in cross-section and of greater thickness than the width of the annular groove 12; and an intermediate membrane-like portion 23 which tapers from a relatively thin circular line 24, adjacent to the flange 22, thickeningly to an inner hub-joining portion 25.

The inner diameter of the hub portion 21, when in unstressed condition as shown in FIG. 2, is slightly less than the diameter of the shaft $p$ on which it is to be fitted. When applied to the shaft $p$ as in FIG. 1, its inner diameter is stretched, but only slightly. The inward grasping pressure which the stretched hub portion 21 exerts on the shaft $p$ is substantially less than atmospheric pressure, and preferably not greater than 7 p.s.i.

Since the thickness of the flange portion 22 as molded exceeds the width of the seal-retaining groove 12, it must be compressed to fit in the groove 12. Due to its elasticity, its resistance to such compression exerts a corresponding pressure, somewhat greater than atmospheric pressure, against the forward and aft faces 13 of the groove 12. While any pressure greater than atmospheric will suffice, I prefer to utilize compression of 40 p.s.i. or more.

In normal operation the pressure of the liquid within the supply pipe $a$ is 100 p.s.i. or greater; it will act on the seal member 20 as shown by the small arrows in FIGS. 1 and 3; and the soft rubber material of the seal will be forced tightly into the corners of the groove 12.

When there is no water flow in the pipe $a$ the parts will be in the position shown in FIGS. 1, in which the membrane-like intermediate seal portion 23 presses and conforms fluid-like against the slide washer 16 and Teflon facing member 14. The inner diameter of the slide washer 16 provides only a small gap about the diameter of the shaft $p$ so that no considerable amount of the seal material can be extruded into it; and no material so extruded can reach forward beyond the washer 16 to the bore $k$.

Flow of water against the vane $t$ causes the shaft $p$ to pivot about the pin $o$, as shown in FIG. 3. Easy pivoting results in part from lack of any extruded seal material in the bore $k$. Since the stainless steel slide washer 16 is displaced from the pivot pin $o$, pivoting is also accompanied by sliding of the slide washer 16 against the slick surface of the Teflon facing member 14. Ease of pivoting is further aided by the almost fluid-like flexibility of the material from which the seal member 20 is formed, which permits it to assume the distorted shape shown in FIG. 3 within any substantial build-up of spring-like resistance.

The exceptional ease of operating the present invention is disclosed by the following example. Utilizing a seal whose Shore rating was A-35, a hydraulic pressure within the chamber $g$ of 100 p.s.i., a Teflon-faced member 14 and a stainless steel slide washer 16 as shown, the torque or twisting moment required to be applied about the pivot pin $o$ to deflect the shaft $p$ was measured at 3.9 ounce inches. This torque remained substantially constant over the entire range of angular pivotal movement of the shaft $p$. Examination of the seal 20 thereafter showed it was undamaged. In contrast, without the facing member 14 and washer 16, the applied torque required commenced at 6.2 ounce inches and increased as the shaft $p$ was pivoted, to 20 ounce inches, that is, more than five times as great. Furthermore, subsequent examination showed that the seal material was partially cut.

The low operating torque, without substantial increase with angle of shaft deflection, causes the water-flow sensor to operate with increased sensitivity and reliability. The shaft $p$ will transmit its operating force reliably to any mechanism which it is intended to operate, such as a conventional retard-operated alarm switching system.

The present invention is also designed to resist damage when the water supply pipe $a$ is drained, as for example when an entire sprinkler system is drained. Draining such a system may create a relatively large partial vacuum within the chamber $g$. In prior systems this condition frequently caused a blowing-in of the seals, rupturing and displacing them and rendering the sprinkler system useless until they were replaced.

Referring now to FIG. 4, when the pressure within the chamber $g$ drops substantially below atmospheric pressure, the room air pressure exerted through the bore $k$ will be communicated through the inner diameter of the facing member 14 to the slide washer 16 and will penetrate through its inner diameter, while also flowing outward to its outer diameter, causing the membrane portion 23 to deflect inwardly as schematically shown. Since the flange portion 22 of the seal member 20 has been force-fitted in the groove 12 by compression substantially exceeding atmospheric pressure, atmospheric pressure will not dislodge it from the groove 12. In contrast, the inward grasping pressure which the hub portion 21 exerts on the shaft $p$ is much less than atmospheric pressure. Accordingly, room air pressure will readily distend the hub portion 21 to permit passage of air therethrough into the chamber $g$, as shown by the arrows in FIG. 4. Furthermore, inward deflection (or "ballooning") of the membrane portion 23 as shown in FIG. 4 will apply radially-outward tension forces to the hub-joining portion 25; these forces further distend the hub portion 21. The aft-and-inward taper of the membrane portion 23 intensifies the radial tension so applied to the hub portion 21.

Accordingly, when the sprinkler system is drained, the inward passage of air, as shown in FIG. 4, equalizes the pressure inwardly of the seal member 20 so that it cannot rupture; while the super-atmospheric compressive pressure which its flange 22 exerts against the opposite walls of the groove 12 prevents displacement by the atmospheric pressure. Hence, after draining the sprinkler system, it may be immediately refilled without necessity of inspection and replacement of seal members 20.

While the present invention has been described as applicable to waterflow sensors of sprinkler systems, it may obviously be used in other environments and with liquids other than water, as will be apparent to persons skilled in the art.

I claim:

1. For use in a liquid flow detector of the type including a casing securable to a flow pipe and having a vane positioned therein on the inner end of a shaft extending outward through the pipe and through a forward bore opening of a casing, forwardly of which the shaft is pivoted, the casing having an inner flat forward face formed about such bore opening, the invention comprising the combination of
   A. an annular seal-retaining groove in the casing at the periphery of such inner forward face,
   B. a shaft seal integrally molded of elastic, rubber-like material and having
     an outer ring-like compressible flange positioned within said seal-retaining groove and whose uncompressed thickness so exceeds the width of said seal-retaining groove as the require greater than atmospheric pressure to compress and insert it within the groove,
     a central inward-extending hub portion having a central bore fitted onto such shaft, said bore being sized to fit onto such shaft with an inwardgrasping pressure less than atmospheric pressure, the seal being otherwise free of retention, and
     an intermediate membrane portion whose thickness lessens from the hub portion to the flange portion,
     said central and intermediate portions having together a forward surface, and
   C. a rigid washer on the shaft positioned between said seal forward surface and the inner forward face of such casing, the washer outer diameter being smaller than said seal forward surface and its inner diameter being smaller than such casing bore opening,
     whereby, on removal of pressure within the casing, the washer will be displaced aft, and the excess of external atmospheric pressure exerted at and through the said bore opening will cause the said membrane to bow inwardly, exert tension on the thicker membrane portion adjacent to the hub, and distend the hub, thereby to blow atmospheric air inward around the shaft while leaving the flange portion undisturbed and retained by its superatmospheric compression within the retaining groove.

2. For use in a liquid flow detector of the type including a casing securable to a flow pipe and having a vane positioned therein on the inner end of a shaft extending outward through the pipe and through a forward bore opening of a casing, forwardly of which the shaft is pivoted, the casing having an inner flat forward face formed about such bore opening, the invention comprising the combination of
   A. an annular square-cut seal-retaining groove in the casing at the periphery of such inner forward face,
   B. a shaft seal integrally molded of elastic, rubber-like material and having
     an outer ring-like compressible flange portion positioned within said seal-retaining groove and whose uncompressed thickness is greater than the width of said groove,
     a central inward-extending hub portion having a central bore fitted onto such shaft, and
     an intermediate membrane portion whose thickness lessens from the hub portion to the flange portion,
     whereby to expose the radial inner surface of the flange portion to the pressure of the liquid and to press its material sealedly into the corner portions of the square cut groove, and to allow easy flexure of the membrane portion when the shaft pivots, and
   C. a rigid washer mounted on said shaft and positioned between the seal and such casing forward face, the outer diameter of the washer being smaller than said inner forward face and its inner diameter being smaller than such bore opening, whereby to prevent extrusion of the seal material into such bore opening around such shaft.

3. A shaft seal as defined in claim 8, wherein the rubber-like material of which the seal is molded has a Shore rating in the range of A-20 to A-50.

4. For use in a liquid flow detector of the type including a casing securable to a flow pipe and in liquid communication therewith and having a shaft, the casing having a forward bore opening through which the shaft extends and forwardly of which the shaft is pivoted, the casing having about the bore opening an inner flat forward face, a shaft seal assembly, comprising
   a shaft seal integrally molded of rubber-like material and having an outer ring-like flange, a central inward extending hub, and an intermediate membrane portion,
   a washer positioned against the forward surface of the seal having an inner diameter greater than that of the hub portion, whereby to fit loosely on such shaft, and an outer diameter substantially less than the diameter of the seal, and an annular facing member against which the washer is presented, formed of a material characterized by a low coefficient of friction and positioned at the inner forward face of such casing concentric with its bore opening and extending radially therefrom, whereby the washer prevents extrusion of the seal material into the bore opening under the pressure of such liquid and whereby, when the shaft is angularly deflected, the washer will slide easily on the facing member.

5. A shaft seal assembly as defined in claim 4, wherein the washer is steel and the annular facing member is Teflon.

* * * * *